Feb. 23, 1926.
W. J. ELDER ET AL
1,574,238
METHOD OF IMPREGNATING MATCH SPLINTS TO PREVENT AFTER GLOW
Filed Nov. 9, 1923
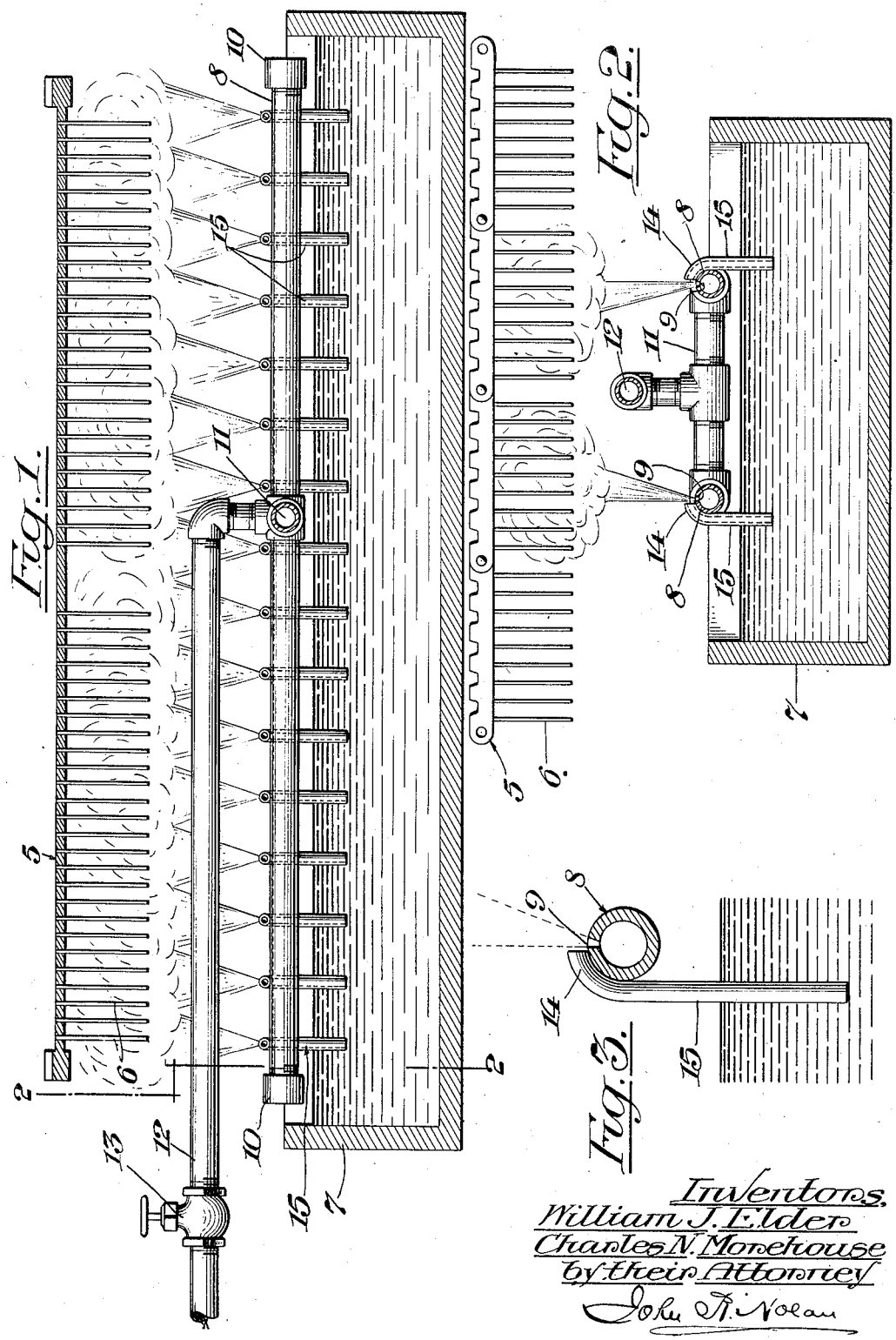
Inventors,
William J. Elder
Charles N. Morehouse
by their Attorney
John T. Nolan Patented Feb. 23, 1926.

1,574,238

UNITED STATES PATENT OFFICE.

WILLIAM J. ELDER AND CHARLES N. MOREHOUSE, OF OSWEGO, NEW YORK, ASSIGNORS TO THE DIAMOND MATCH COMPANY, OF CHICAGO, ILLINOIS, A CORPORATION OF ILLINOIS.

METHOD OF IMPREGNATING MATCH SPLINTS TO PREVENT AFTERGLOW.

Application filed November 9, 1928. Serial No. 673,692.

*To all whom it may concern:*

Be it known that we, WILLIAM J. ELDER and CHARLES N. MOREHOUSE, both citizens of the United States, and residents of the city of Oswego, in the county of Oswego and State of New York, have invented certain new and useful Improvements in Methods of Impregnating Match Splints to Prevent Afterglow, of which the following is a specification.

This invention relates to a method of impregnating match splints with a solution of material adapted to render them non-glowing when they have been ignited and their flame extinguished.

Heretofore, in wet impregnation processes, the splints, as they progressed with the carrier of a match machine, have been immersed in a concentrated solution of material, such as ammonium phosphate; thus necessitating the subsequent passage of the splints through an extensive heating unit wherein the splints were subjected to the action of a high temperature for the purpose of thoroughly drying the splints preparatory to their immersion in paraffin. We have discovered that adequate impregnation of the splints to prevent after-glow can be effected by subjecting the splints to a superficial treatment with the concentrated solution, and that when they are so treated the splints can be thoroughly and rapidly dried without subjecting them to the action of a high degree of heat; thus not only economizing in the use of the solution and reducing the length of the match carrier as well as the capacity and duty of the heating unit, but also protecting the splint material from deteriorating heat influence.
In practicing our invention the impregnating solution is diffused in a fine spray, or mist, amongst the individual splints as they progress with the match carrier as will be hereinafter described and claimed.
In the drawings:—

Figure 1 is a longitudinal vertical section of a form of impregnating apparatus for carrying out our invention, a portion of a match splint carrier being shown.
Fig. 2 is a transverse section, as on the line 2—2 of Fig. 1.

Fig. 3 is a sectional detail, enlarged, of one of the spray pipes including an associated ejector tube, of the impregnating apparatus.

Referring to the drawings, 5 designates a portion of an endless carrier of a match machine, which carrier comprises an endless chain of perforated plates into the perforations of which splints, 6, are inserted in consecutive rows and are thus transported in spaced relation to each other throughout the match making path. Suitably located below the horizontal path of the depending splints on the carrier, after they leave the splint-inserting station and before they reach the drying unit which precedes the paraffin bath, is a tank 7 within which is contained a water solution of a suitable antiglowing impregnating material such, for example, as ammonium phosphate. Upon or adjacent the top of the tank are supported one or more pipes, 8, which extend from side to side of the tank. The upper walls of these pipes have formed therein longitudinally extending rows of spaced-apart vent orifices, 9, which are directed toward but at a slight angle to the vertically depending splints, the orifices of one row being reversely inclined to those of the other row. In the present instance two spaced-apart parallel pipes are employed, each pipe being closed at its respective ends by caps 10. Midway between their ends, the pipes are connected by a cross pipe 11 from which extends a pipe 12 leading to a suitable source of compressed air supply. This pipe 12 is equipped with a regulating valve 13. Secured to each pipe 8, adjacent the respective orifices, are the curved upper ends 14 of a series of tubes 15 which depend well into the liquid contents of the tank, each tube being open at its respective ends and the upper end thereof being in close relation to an orifice of the associated pipe, as shown.

By the foregoing described construction it will be seen that when the valve 13 is opened, air under pressure will issue from the orifices of the pipes 8 and across the adjacent openings of the respective tubes 15, thus raising the liquid through the tubes from the tank and, by contact, reducing the liquid to fine sprays and projecting it against and longitudinally of the depending splints. Since the two rows of orifices of the respective pipes are reversely inclined to the vertical, all exposed surfaces, including the fronts and backs, of the progressing splints are effectually sprayed with the liquid, as indicated in Fig. 2. The quantity of concentrated solution thus diffused upon the surfaces of the splints is small, but yet it is ample to insure adequate impregnation for the prevention of after-glow. Therefore, the amount of water to be dried out of the splints is slight compared with that present in other types of wet impregnation.

It is to be understood that the particular form of apparatus herein shown and described is to exemplify an efficient means for carrying out our novel method of impregnating match splints.

We claim—

1. A process of treating match splints which consists in subjecting the individual splints to a fine spray of a concentrated solution of material adapted to impregnate the splints and prevent after-glow.

2. A process of treating spaced-apart match splints on a travelling match carrier, which consists in projecting toward and amongst the individual splints jets of air, under pressure, carrying a finely-divided concentrated solution of material adapted to impregnate the splints and prevent after-glow.

Signed at Oswego in the county of Oswego and State of New York this 5th day of November, A. D., 1923.

WILLIAM J. ELDER.
CHARLES N. MOREHOUSE.